UNITED STATES PATENT OFFICE 2,391,251

DERIVATIVES OF FATTY ACIDS AND METHOD OF PREPARING SAME

John R. Long, Akron, Ohio, assignor to Wingfoot Corporation, Akron, Ohio, a corporation of Delaware No Drawing. Application August 8, 1941,
Serial No. 405,998

2 Claims. (Cl. 260—464)

This invention relates to certain organic compounds containing nitrogen and to a method of preparing the same. More particularly, it relates to the preparation of cyanhydrin acetates of acetyl fatty acid esters and to substituted acrylonitriles which may be derived therefrom.

Various ketones have heretofore been treated with hydrogen cyanide to form cyanhydrins and these, in turn, may be acetylated to obtain the cyanhydrin acetates. It has now been found that the keto acid esters may be similarly treated to yield valuable new compounds, the cyanhydrin acetates so produced being subjected to pyrolysis to leave substituted acrylonitriles.

The invention embraces cyanhydrins and cyanhydrin acetates of acetyl fatty acid esters, and carboalkoxy alkyl substituted acrylonitriles derived from the cyanhydrin acetates. These compounds may be obtained in a series of steps starting with a keto acid ester of the general formula $CH_3-CO(CH_2)_xCOOR$, where $x$ is zero or an integer and R is an ester-forming group, those esters being preferred in which the acid contains not more than four methylene groups. Also, while R may be any ester-forming group, the alkyl esters are preferred, particularly the methyl esters.

In the preparation of the compounds, the keto acid ester, such as methyl pyruvate, is treated with hydrogen cyanide, usually in the presence of sodium cyanide or a similar catalyst. When the HCN gas has been absorbed in an amount corresponding to the molecular equivalent of the ester, or more or less, as may be desired, the mixture is permitted to stand. Preferably the temperature should be kept in the neighborhood of 40–50° C. during the addition of the hydrogen cyanide. The cyanhydrin so formed may be separated or the mixture may be subjected to the next step without such separation. In the next operation, an acetylating agent, such as acetic anhydride in the presence of sulfuric acid, is employed, the cyanhydrin being added to the acetylating agent while maintaining the temperature at about 100–110° C., although the temperature may be varied as indicated by the course of the reaction. The cyanhydrin acetate is formed in this step and this product may be recovered by filtering off solids and distilling to remove acetic acid. Further purification may be required, as by distillation under a higher vacuum.

The cyanhydrin acetate obtained by the foregoing procedure may then be pyrolyzed by heating in a furnace at a temperature of 535–550° C., or other suitable temperatures, usually between 500–600° C. The vapors leaving the furnace are cooled and then distilled in the presence or absence of a polymerization inhibitor, such as hydroquinone. The product may be termed an ester of a cyano acid or a carboalkoxy nitrile and is obtained as a polymer or as a monomer. Of course, the procedure outlined for the pyrolysis may be employed with modifications in the pyrolysis of other cyanhydrin acetates.

The reactions involved in the preparation proceed as follows:

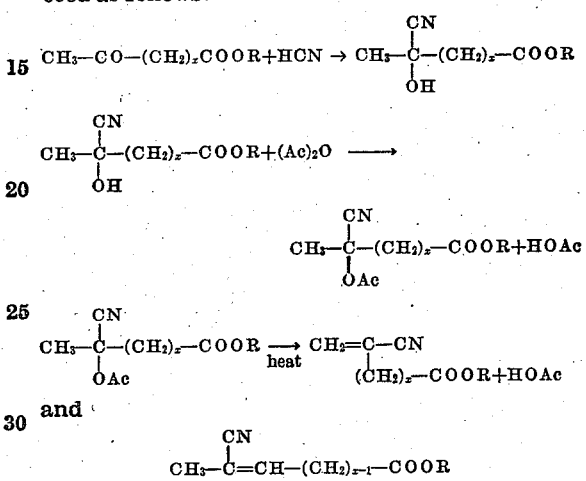

and $$CH_3-\overset{\overset{CN}{|}}{C}=CH-(CH_2)_{x-1}-COOR$$

To illustrate one means of preparing the compounds constituting the subject matter of the invention, the following examples are given, although it will be understood that no limitation is intended thereby.

EXAMPLE 1

*Cyanhydrin acetate of methyl pyatruvate*

Hydrogen cyanide gas was bubbled into 220 grams of methyl pyruvate containing several grams of NaCN until the weight had increased 60 grams. This is slightly more than the theoretical amount corresponding to the methyl pyruvate present. The temperature was maintained at 40–50° C. during the addition of the HCN. After standing overnight, the mixture was poured into 224 grams of acetic anhydride containing 10 grams of sulfuric acid, a temperature of 100–110° C. being maintained. The reaction mixture was filtered to remove solids and was then distilled on a water pump to remove acetic acid. The crude product was again distilled with the aid of an oil pump. The product obtained was the cyanhydrin acetate of methyl pyruvate having the formula

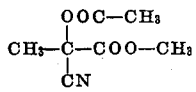

The compound distills at 117–118° C. at 18 mm.; index of refraction $n_D^{25}=1.4205$; density $d_{30}=1.1315$. % N theory=8.20; Found=8.37.

EXAMPLE 2

Methyl alpha cyanoacrylate

The cyanhydrin acetate obtained in the preceding example was subjected to pyrolysis in a pyrolysis chamber consisting of a 22 mm. Pyrex tube packed with copper turnings and heated in a two-foot vertical furnace to a temperature of 535–550° C. After passage of the cyanhydrin acetate through the tube, the vapors given off were cooled by passing them through a water-cooled condenser. One hundred and twenty-five grams of the cyanhydrin acetate of methyl pyruvate were passed through the furnace in 75 minutes under a pressure of 200 mm. The product was distilled under reduced pressure in the presence of hydroquinone to drive off the acetic acid which results from pyrolysis. The product was methyl alpha cyanoacrylate:

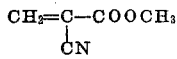

and is obtained in polymeric form as a hard glasslike solid on cooling.

EXAMPLE 3

Cyanhydrin acetate of methyl levulinate

Into 545 grams of methyl levulinate,

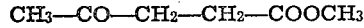

was passed hydrogen cyanide gas, in the presence of 3.0 grams of NaCN until the weight had increased 114 grams. The reaction mixture was kept at a temperature of 40–50° C. during the addition of the HCN. The reaction mixture was allowed to stand overnight and was then added slowly, with shaking, to a mixture of 483 grams of acetic anhydride and 5.5 grams of H₂SO₄ kept at a temperature of 100–120° C. This temperature was maintained for a half hour after the addition was completed. The acetic acid generated was distilled off with the aid of a water pump and the product residue distilled on an oil pump. The substance distilling between 115–130° C. under a pressure of 2 mm. was taken to be the cyanhydrin acetate of methyl levulinate having the formula

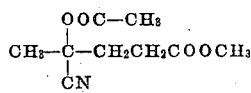

The nitrogen analysis was as follows: % N Obs.=7.30, 7.28; Calc. 7.05. The index of refraction was $n_D^{25}=1.4400$; the density was $d_{27}=1.1170$.

EXAMPLE 4

Alpha (beta carbomethoxy ethyl) acrylonitrile

The compound prepared in Example 3, the cyanhydrin acetate of methyl levulinate, was passed through a pyrolysis chamber consisting of a 25 mm. (i. d.) Pyrex tube filled with clay saddles. The tube was heated to a temperature of 565–585° C. in a 2½ foot vertical wire-wound electric furnace. The vapors, on leaving the furnace, were cooled by passing them through a water condenser. In the course of 2½ hours 468 grams of the cyanhydrin acetate was passed through the pyrolysis tube at a pressure of 30–35 mm. The crude product was fractionated under reduced pressure to obtain a main fraction distilling at 80–85° C. The product was probably alpha (beta carbomethoxy ethyl) acrylonitrile having the formula

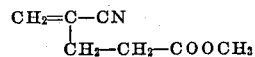

Its physical characteristics were as follows: $n_D^{26}=1.4478$; $d_{27}=1.0352$. % N: Found 9.8, 9.9; Calc. 10.07. An isomeric substance may also be present having the formula:

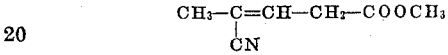

but, if so, it had so nearly the same boiling point that no separation occurred upon distillation.

EXAMPLE 5

Copolymer with butadiene

The polymerizing properties of the compound obtained in Example 4 were tested by polymerizing the same with butadiene. A mixture of 9.6 grams of butadiene and 6.4 grams of alpha (beta carbomethoxy ethyl) acrylonitrile was emulsified in 20 cc. of an aqueous solution containing 0.266 gram of sodium perborate, the aqueous solution being made up of 10 cc. of McIlvain's buffer giving a hydrogen ion concentration of pH=4.1 and 10 cc. of 6% Duponol as an emulsifier. The emulsion was agitated for a period of 42 hours at a temperature of 30° C. Thereafter, the polymer was coagulated with alcohol, washed and dried, a yield of 9.25 grams of a soft copolymer being obtained.

Other compounds similar to those herein described may also be prepared by the method disclosed or by similar methods. For example, the methyl ester of acetobutyric acid and other omega acetyl fatty acid esters may be treated with hydrogen cyanide and acetic anhydride and may be subsequently pyrolyzed, all in a manner similar to that described above, to yield, particularly, the cyanhydrins and cyanhydrin acetates of omega acetyl fatty acid esters and the alpha (omega carboalkoxy alkyl) acrylonitriles. Also, while the methyl esters have been mentioned, it will be obvious that ethyl, propyl, butyl, benzyl and higher esters may be prepared, although the methyl ester is preferred. The method of obtaining the materials may likewise be varied in many respects without departing from the scope of the invention.

Hence, while there have been described above the preferred embodiments of the invention, it will be apparent to those skilled in the art that various modifications and changes may be made therein without departing from the spirit of the invention or from the scope of the appended claims.

I claim:

1. The cyanhydrin acetates of pyruvic acid esters.
2. The cyanhydrin acetate of methyl pyruvate.

JOHN R. LONG.